US011884153B2

(12) United States Patent
Lottes et al.

(10) Patent No.: US 11,884,153 B2
(45) Date of Patent: Jan. 30, 2024

(54) DISPLAY DEVICE AND MOTOR VEHICLE WITH THE DISPLAY DEVICE

(71) Applicant: AUDI AG, Ingolstadt (DE)

(72) Inventors: Daniel Lottes, Ihrlerstein (DE); Christian Wall, Hitzhofen (DE); Romain Diboine, Seoul (KR); Seonghwan Kim, Seoul (KR); Doh Yeon Kim, Seoul (KR)

(73) Assignee: AUDI AG, Ingolstadt (DE)

( * ) Notice: Subject to any disclaimer, the term of this patent is extended or adjusted under 35 U.S.C. 154(b) by 425 days.

(21) Appl. No.: 17/416,089

(22) PCT Filed: Dec. 10, 2019

(86) PCT No.: PCT/EP2019/084464
§ 371 (c)(1),
(2) Date: Jun. 18, 2021

(87) PCT Pub. No.: WO2020/126686
PCT Pub. Date: Jun. 25, 2020

(65) Prior Publication Data
US 2022/0072956 A1    Mar. 10, 2022

(30) Foreign Application Priority Data

Dec. 19, 2018  (EP) .................................. 18213949

(51) Int. Cl.
*G06F 1/16*  (2006.01)
*B60K 35/00*  (2006.01)
*G02F 1/1333*  (2006.01)

(52) U.S. Cl.
CPC ........ *B60K 35/00* (2013.01); *G02F 1/133308* (2013.01); *G06F 1/1603* (2013.01);
(Continued)

(58) Field of Classification Search
CPC .......................... G06F 1/1603; G02F 1/133308
See application file for complete search history.

(56) References Cited

U.S. PATENT DOCUMENTS

| 6,570,628 | B1 | 5/2003 | Hirano | |
|---|---|---|---|---|
| 2008/0252555 | A1* | 10/2008 | Jeon | ...................... G06F 1/1616 |
| | | | | 345/1.1 |
| 2018/0210504 | A1* | 7/2018 | Moser | ................... G06F 1/1679 |

FOREIGN PATENT DOCUMENTS

| DE | 10 2007 034 587 A1 | 4/2008 |
|---|---|---|
| DE | 10 2009 040 965 A1 | 3/2011 |

(Continued)

OTHER PUBLICATIONS

International Search Report dated Mar. 11, 2020 for International Application No. PCT/EP2019/084464.

(Continued)

*Primary Examiner* — Mukundbhai G Patel
(74) *Attorney, Agent, or Firm* — STAAS & HALSEY LLP

(57) ABSTRACT

A base unit with a base dent region supports a main display unit having a main display panel. The main display unit is integrated in the base dent region and is rotatable about a base axis between a main loaded position and a main viewing position where the main display panel is visually accessible to a user from a predefined head position. The display device includes an auxiliary display unit which is integrated in a main dent region of the main display unit. The auxiliary display unit includes an auxiliary display panel which is designed to be visually accessible to the user from the predefined head position by rotating the main display unit about the base axis.

20 Claims, 2 Drawing Sheets

(52) U.S. Cl.
CPC ............... *B60K 2370/1526* (2019.05); *B60K 2370/175* (2019.05); *B60K 2370/52* (2019.05); *B60K 2370/67* (2019.05)

(56) References Cited

FOREIGN PATENT DOCUMENTS

| | | |
|---|---|---|
| DE | 10 2016 224 500 B3 | 4/2018 |
| JP | 9-101158 | 4/1997 |
| WO | WO 2021221600 A1 * 11/2021 ........... G06F 1/1675 |

OTHER PUBLICATIONS

Translation by WIPO of International Preliminary Report on Patentability for PCT/EP2019/084464 dated Jun. 16, 2021, 7 pp.
Extended European Search Report dated Jun. 5, 2019 for European Application No. 18213949.3.

* cited by examiner

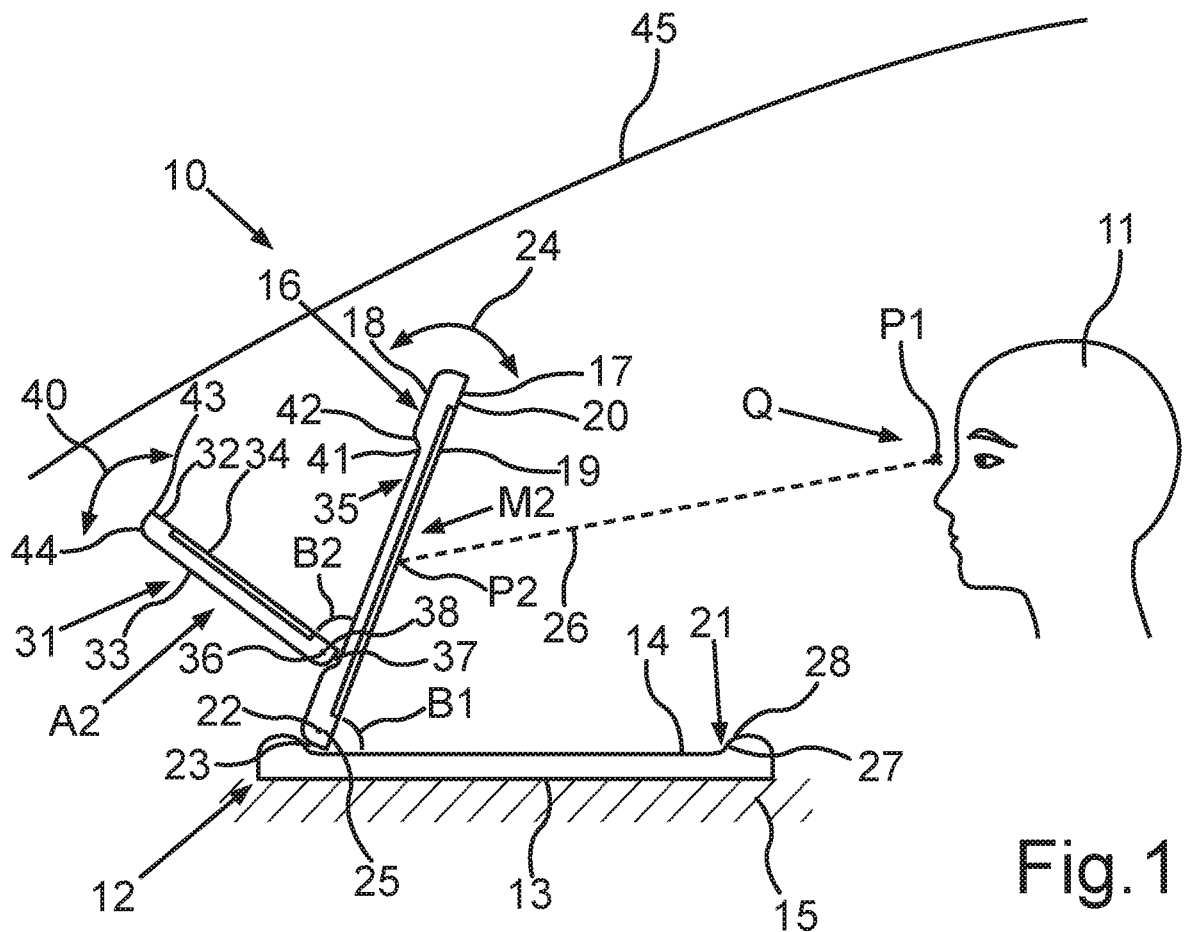
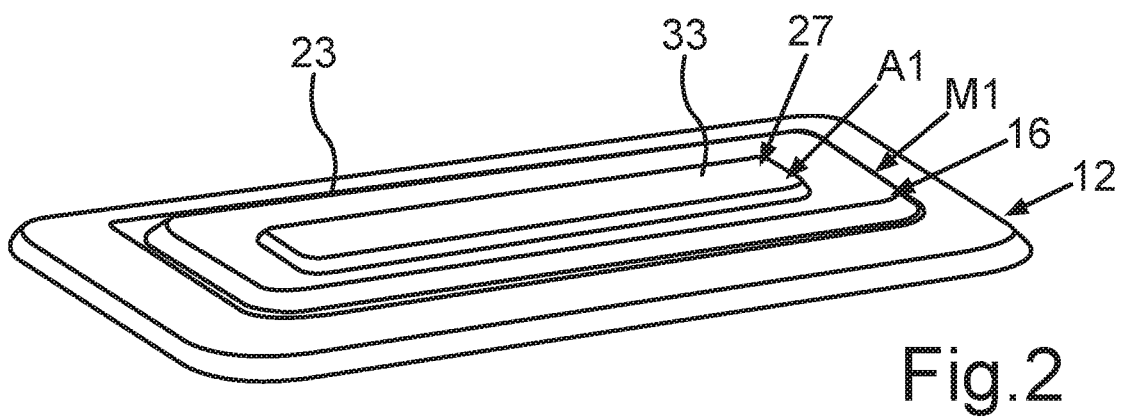

DISPLAY DEVICE AND MOTOR VEHICLE WITH THE DISPLAY DEVICE

CROSS REFERENCE TO RELATED APPLICATIONS

This application is a U.S. national stage of International Application No. PCT/EP2019/084464, filed on Dec. 10, 2019. The International Application claims the priority benefit of European Application No. 18213949.3 filed on Dec. 19, 2018. Both the International Application and the European Application are incorporated by reference herein in their entirety.

BACKGROUND

Described below are a display device for displaying information to a user and a motor vehicle with such a display device.

Display devices are being used more and more frequently in modern motor vehicles. In order to view a large amount of information, the display screens of the display devices need to be larger than the display devices used today. However, it is not always desired to have large display screens, as they may block the view through the main window. Therefore, there are various possibilities to incorporate variations in the sizes of the display devices and/or possibilities to vary the sizes of the display screens of the display devices.

Document US 006 570 628 B1 discloses a display device comprising an enclosure, a first display unit and a second display unit. The enclosure is provided with an opening portion through which the first display unit is loaded or unloaded. The first display unit is movably provided between a loading position where the first display unit is completely loaded in the enclosure and a viewing position where information is visually recognized by a driver. The second unit is pivotally supported at its end position by a pivotal shaft attached to the enclosure. The second display unit includes a display and a frame member. However, of such a display device involves complex mechanical mechanism for the movement and adjustment of the first display unit and the second display unit.

Document DE 10 2016 224 500 B3 discloses a display device for a motor vehicle, comprising a display surface device with a display surface for displaying a display content, characterized by at least two display regions of the display surface device, and a folding device adapted to fold the display surface means. However, such a display device involves a complex mechanical mechanism for the movement and adjustment of the two display regions.

Document DE 10 2007 034 587 A1 discloses a sun visor comprising an integrated display for displaying information. The sun visor is provided at a windshield of the vehicle. A display panel is arranged on the sun visor in such a way that it represents the respective information in an activated condition such that the information is readable from outside the motor vehicle through the windshield. However, the display device can only be used as a sun visor.

SUMMARY

Described herein is a display device to display a variety of information to a user, such that the display device uses the installing space effectively.

The display device for displaying information to a user can be a part of a motor vehicle or an accessory, like, e.g., an infotainment device or a navigation device. The display device has a base unit with a front side and rear side. The front side of the base unit can be a flat surface whereas the rear side of the base unit includes a base dent region. A dent region is a hollow or pit, where the surface of the rear side is recessed in comparison with the surrounding surface. The base dent region can be in form of a shallow or an indented region on the rear side of the base unit. The base unit can function as a foot piece or stand for the actual display.

Accordingly, the display device further includes a main display unit having a front side and a rear side. The front side of the main display unit includes a main display panel. The main display panel can be a liquid crystal display panel (LCD) or a display panel with organic light emitting diodes (OLED), e.g., of the type such as the ones used in an LCD television, a computer monitor, an instrument panel or a mobile telephone, such as a smartphone. In a motor vehicle the main display panel can be for an infotainment system and/or a navigation system. Furthermore, the main display panel can be used to display information about the functionalities of at least one electric appliance mounted in the motor vehicle, e.g., an operation status and/or a setting status of a music system and/or an air conditioner. It is further thinkable, that the main display panel can be designed as an electronic interface, e.g., a touch screen, where the user can provide user inputs by touching and/or pressing respective symbols and/or virtual buttons for choosing different set of information to be displayed on the main display panel similar to a smartphone or a touchpad.

The main display unit is designed to be integrated or arranged in the base dent region of the base unit. The main display unit is attached to at least one point or to several points on an edge of the base dent region by an attaching mechanism, which can be taken from the related art by a skilled person, e.g., an attaching mechanism with a hinge joint. Furthermore, the main display unit is designed to rotate about a base axis parallel to the edge of the base dent region between a main loaded position where the main display panel is completely loaded in the base dent region (i.e. the main display panel is not visible, but rather fully protected), and a main viewing position where information on the main display panel is visually accessible to a user from a predefined head position. In a motor vehicle, this head position may be, e.g., the position of the head rest of the driver's seat. The arrangement of the main display panel in relation to the base unit may be such that the front side of the main display unit and the rear side of the base unit enclose an angle, such that when the enclosed angle is 0 degrees, then the main display panel is completely located inside the base dent region and/or a main display panel frame is in contact with the rear side of the base unit. It is further thinkable, that the main display panel is switched off by a switching mechanism automatically, as soon as the main display unit is rotated to the main loaded position. This is of advantage because this ensures conservation of electrical energy, which is needed to operate the main display panel, since in the main loaded position the main display panel is not visually accessible to the user. Furthermore, a mechanical mechanism to enable a rotation of the main display unit about the base axis can be a simple mechanism similar to the one commonly used for a laptop with a flappable screen attached to a keyboard. The mechanical mechanism can be known to a person skilled in art in a corresponding field of technology. For example, the already mentioned hinge joint may be used.

The display device effectively provides a second, auxiliary display unit. The an auxiliary display unit has a front side and a rear side. The front side of the auxiliary display unit includes an auxiliary display panel. The auxiliary display panel can be a liquid crystal display panel or an OLED display panel.

The rear side of the main display unit has a main dent region. The main dent region is in form of a shallow or an indented region on the rear side of the main display unit. The auxiliary display unit is integrated or arranged in the main dent region. The auxiliary display unit is integrated or arranged in the main dent region by attaching or connecting to the main dent region in a secured manner, so that the auxiliary display unit can be attached to the main display unit effectively. In other words, while the base unit can function as the foot piece or stand for the main display unit, the main display unit can function as the foot piece or stand for the auxiliary display unit.

Furthermore, the auxiliary display panel is designed to be visually accessible to the user from the predefined head position by rotating the main display unit about the base axis into the main loaded position. This is of advantage because it enables the user to change or choose display panels of different types and/or sizes as per requirement, so that an effective use of space, for example in the motor vehicle, can be ensured. For example, at a point of time the information on the main display panel can be visually accessible to the user from the head position, e.g., from a driving seat in a motor vehicle. If the user decides to change the display panel, for example to change to a smaller sized panel due to space requirements at a particular point of time, then the user can send an input signal to an electronic control unit by an input device. The input signal can be realized by pressing a button on an input device or by a gesture of the user or by an haptic signal. After receiving the input signal by the electronic control unit, the main display unit can be rotated by the electronic control unit about the base axis from the main viewing position to the main loaded position. At this particular point of time, the auxiliary panel which is attached to the main dent region can rotate along with the main display unit and move to the former position of the main display unit, so that the user can be able to view information on the auxiliary display unit from the head position. It is further thinkable, the main display unit and the auxiliary display unit can be selected and/or adjusted by the user manually.

In one embodiment, the auxiliary display unit can be attached to at least one point on an edge of the main dent region. Furthermore, the auxiliary display unit can be rotatable about a main axis parallel to the edge of the main dent region between an auxiliary loaded position where the auxiliary display panel can be completely loaded in the main dent region, and an auxiliary viewing position where information on the auxiliary display panel can be visually accessible to the user from the predefined head position, if the main display unit is in the main loaded position. In other words, the auxiliary display unit can be attached to the at least one point on the edge of the main dent region, for example an edge of the main dent region along the width of the main dent region, such that the auxiliary display unit can be rotated or pivoted about the attached edge of the main dent region. For example, at a point of time a the information on the auxiliary display panel can be visually accessible to the user, for example the navigation route. If at a later point of time, the user decides to close the auxiliary display panel, then the user can send an input signal to the electronic control unit by the input device. After receiving the input signal by the electronic control unit, the auxiliary display unit can be rotated about the main axis from the auxiliary viewing position to the auxiliary loading position. This is of advantage because it ensures that the auxiliary display panel can be protected from wear when not in use, since in this case the auxiliary display unit can be rotated to the auxiliary loading position by the electronic control unit. Furthermore, a mechanical mechanism to enable a rotation of the auxiliary display unit about the main axis can be a simple mechanism similar to the one commonly used for a laptop with a flappable screen attached to a keyboard. The mechanical mechanism can be known to a person skilled in art in a corresponding field of technology.

In one embodiment, the main display unit can be kept in the main loaded position and/or the auxiliary display unit can be kept in the auxiliary loaded position by the electronic control unit. In other words, when the use the main display panel is needed in order to visually access information, then the main display unit can be rotated to the main viewing position by the electronic control unit, wherein the auxiliary display unit can be rotated to the auxiliary loading position by the electronic control unit. In the case, when the auxiliary display panel suffices the needs of the user, then the main display unit can be rotated to the main loading position by the electronic control unit, whereas the auxiliary display unit cab be rotated to the auxiliary viewing position by the electronic control unit. Furthermore, when the display device is not needed by the user, then the user can send the input signal from the input device to the electronic control unit. After receiving the input signal by the electronic control unit, both the main display unit can be rotated to the main loading position as well as the auxiliary display unit can be rotated to the auxiliary display position. Hence, an effective use of the space by the display unit, e.g., inside the motor vehicle, is ensured, whereas at the same time an effective display of information is ensured.

In one embodiment, a contour and an inner perimeter of the base dent region correspond to a contour and an outer perimeter of the main display unit. Hence, in the main loaded position, it can be ensured that the main display unit occupies the base dent region effectively. Hence, the space in the motor vehicle occupied by the display device can be used efficiently, since when the main display unit is not required, it can be moved to the main loading position, where a large part of the main display unit can be loaded or submerged into the base dent region. Furthermore, a contour and an inner perimeter of the main dent region correspond to a contour and an outer perimeter of the auxiliary display unit. This is of advantage because when the auxiliary display unit is rotated to the auxiliary loading position, then the auxiliary display panel can be completely loaded in the main dent region. Whereas the main dent region is maintained at a minimum possible size to ensure that a maximum portion of the auxiliary display unit is loaded in the main dent region. This ensures a lower material loss in the structural construction of the main display unit due to the minimum possible size of the main dent region, which in turn enables a higher strength and stability to the structure of the main display unit. Furthermore, a correspondence of the contour and the inner parameter of the main dent region to the contour and the outer parameter of the auxiliary display unit can ensure that the rear side of the auxiliary display unit and the part of the rear side of the main display unit surrounding the main dent region form a smooth continuous surface. This in turn can ensure a single smooth surface, for example when the main display unit is in the main loading position and the auxiliary display unit is in the auxiliary loading position, which is ergonomic for the user and it ensures a use of the space effectively.

In one embodiment, the auxiliary display unit has a smaller size, in particular a display height, than the main display unit. This is of advantage because it enables the user to make a choice between a smaller display panel or a larger display panel according to his necessities. For example, during the start of the driving of the motor vehicle, the user would need to view a large set information, such as the navigation route and/or the information about the weather and/or the selection of a playlist of songs from the music system and/or selection of a radio station and/or setting and selection of the audio volume and/or the settings and selection of the air conditioning system. Due to the large set of aforementioned information, the user would prefer a large display panel which can be ensured by the main display unit of the display device, which in turn can occupy a large space in the motor vehicle. However, after the respective selections the user might only require to view the navigation route, hence, the user can send an input signal from the input device to the electronic control unit. The electronic control unit can then rotate the main display unit to the main loading position and rotate the auxiliary display unit to the auxiliary viewing position, which can be of a smaller size than the main display unit. Hence, a smaller space in the motor vehicle can be used by the display device which can ensure a comfortable driving to the user.

In one embodiment, the main viewing position is designed to be adjusted by rotating the main display unit between an angle of 45 degrees and 200 degrees about the base axis. This is of advantage because this allows to adjust and/or set the main viewing position of the main display unit according to a head position of the user with respect to the main display panel or the center of the main display panel. In other words, a best possible view of the information on the main display panel can be ensured according to a sitting position of the user as per his convenience and/or according to the position of the display device, by rotating and adjusting the main display unit. It is thinkable, that once the main display unit is rotated to a suitable angle or position, it can then be held in that position intact by a suitable mechanical mechanism which can be known to a person skilled in the relevant field of technology.

In one embodiment, the auxiliary viewing position is designed to be adjusted by rotating the auxiliary display unit between an angle of 45 degrees and 200 degrees about the main axis. This is of advantage because this allows to adjust and/or set the auxiliary viewing position of the auxiliary display unit according to a head position of the user with respect to the auxiliary display panel or the center of the auxiliary display panel. In other words, the a best possible view of the information on the auxiliary display panel can be ensured according to his sitting position of the user as per his convenience and/or according to the position of the display device, by rotating and adjusting the auxiliary display unit. For example, an input signal to rotate and adjust the auxiliary display unit can be sent by the user from the input device to the electronic control unit. The electronic control unit can then adjust and rotate the auxiliary display unit accordingly. It is thinkable, that once the auxiliary display unit is rotated to a suitable angle or position, it can then be held in that position intact by a suitable mechanism which can be known to a person skilled in the art. Furthermore, in case the display device is located and/or installed on a dashboard of a motor vehicle, then the user, e.g., the driver of the motor vehicle, can park the motor vehicle at a parking place. A virtual button denoting an online parking ticket of that particular location can be selected, by which a digital parking ticket can be procured and can be displayed on the auxiliary display panel. The auxiliary display unit can be then rotated about an to an angle of 180 degrees, such that the digital parking ticket can be visually accessible to a person from outside the motor vehicle through, for example a windscreen of the motor vehicle. Furthermore, in case the display device is located and/or installed on the dashboard of a motor vehicle. The dashboard of the motor vehicle can have a curvy surface structure, thus, the auxiliary display unit can be rotated up to 200 degrees, so that the information on the auxiliary display panel can visually accessible to a person from outside the motor vehicle through, for example a windscreen of the motor vehicle. Hence, the display device can be used as a head-up display device. It is further thinkable, that similar to the use of the auxiliary display unit to display the digital parking ticket or as the head-up display device, the main display unit can also be used similarly.

In one embodiment, the front side of the base unit can be attached to a surface, e.g., a top surface of a dashboard of a motor vehicle. This is of advantage because this enables the user, e.g., the driver of the motor vehicle to have the display device at a convenient position, so that he can have a good view of the information on the main display panel or the auxiliary display panel of the vehicle. Furthermore, the driver can comfortable reach the display device with his hand, to touch a digital button on the main display panel or the auxiliary display panel to choose or select at least one functionality of the of a wide variety of electric appliances mounted in the motor vehicle. Furthermore, the display device can be made of a material of similar composition and/or color and/or structure as that of the surface on which the base unit can be attached.

Also described herein is a motor vehicle with a display device for displaying information to a user.

In one embodiment, the main display unit of the display device can be kept in the main viewing position during an autonomous driving of the motor vehicle by the electronic control unit. This is of advantage because this enables user to view the information on a larger display panel, since the user in this case does not have to worry about controlling a steering wheel. Furthermore, the auxiliary display unit can be in kept the auxiliary viewing position during a manual driving of the motor vehicle by an electronic control unit. This is of advantage because, in this case, the user would need to control the steering wheel of the motor vehicle and hence, would prefer to have space in the vehicle, due to which a smaller display panel, e.g. the auxiliary display panel, could suffice the needs of the user. A signal of information about a status regarding the autonomous driving or manual driving can be sent to the electronic control unit by a driver assistance system. The electronic control unit upon receiving the signal from the driving assistance system can change and/or keep the main display unit in the main viewing position during an autonomous driving of the motor vehicle, whereas in the case of manual driving, the electronic control unit can change and/or keep the auxiliary display unit in the auxiliary viewing position accordingly.

BRIEF DESCRIPTION OF THE DRAWINGS

These and other aspects and advantages will become more apparent and more readily appreciated from the following description of an exemplary implementation, taken in conjunction with the accompanying drawings of which:

FIG. 1 is a side view of a cross section of an embodiment of a display device;

FIG. 2 is a schematic perspective view of an embodiment of the display device;

DETAILED DESCRIPTION

Figure 3:
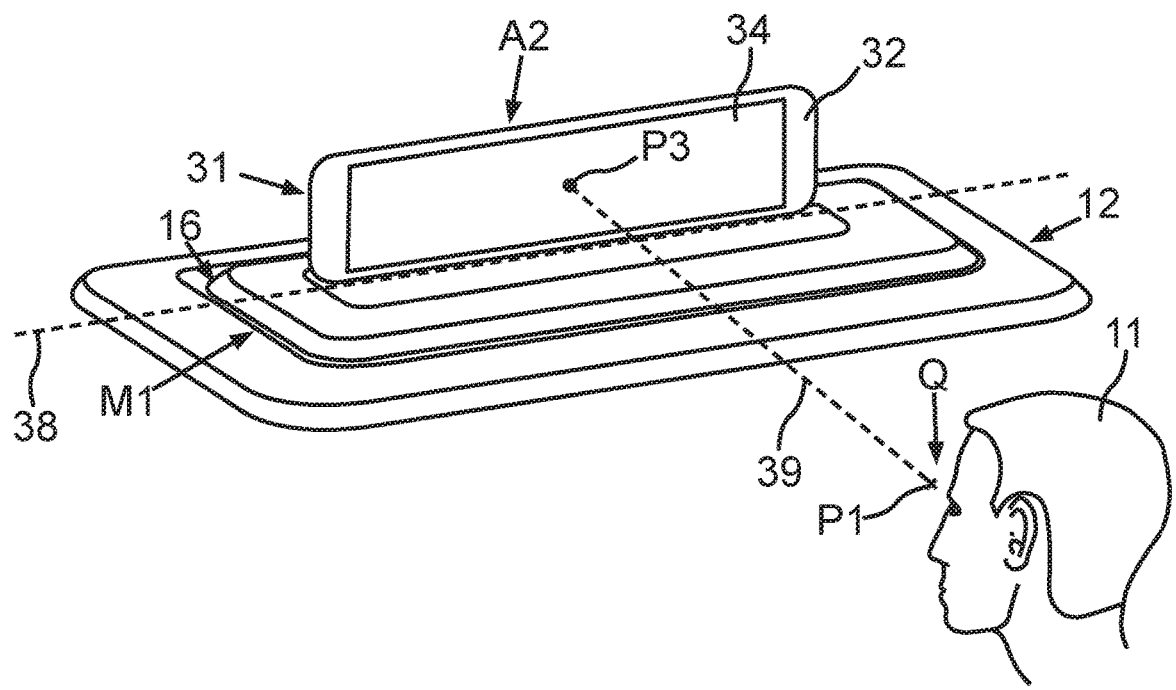
FIG. 3 is a schematic perspective view of an embodiment of the display device.

The embodiment explained in the following has described components that each represent individual features which are to be considered independently of each other and which each develop the invention independently of each other and thereby are also to be regarded as a component in an individual manner or in another than the shown combination. Furthermore, the described embodiment can also be supplemented by further features already described.

In the figures elements that provide the same function are marked with identical reference signs.

FIG. 1 shows a side view of a cross section of an embodiment of a display device 10. The display device 10 is incorporated in a motor vehicle 45 that may be a passenger vehicle. The motor vehicle 45 may have a driver assistance system (not shown in the figure), which can provide, for example, an autopilot functionality. In other words, the driver assistance system may drive the motor vehicle 45 autonomously or fully automatically. The motor vehicle 45 can further include an electronic control unit (not shown in the figure) to operate the display device 10.

The display device 10 may be designed for displaying information to a user 11, for example the driver of the motor vehicle 45. The display device 10 can include a base unit 12. The base unit 12 can have a front side 13 and a rear side 14. The front side 13 of the base unit 12 may be designed to be attached to a surface 15, for example a dashboard of the motor vehicle 45. The rear side 14 can have a base dent region 21.

The display device 10 can have a main display unit 16 with a front side 17 and a rear side 18. The front side 17 of the main display unit 16 can include a main display panel 19. The main display panel 19 can be a liquid crystal display panel (LCD). The main display panel 19 can display large set information, such as the navigation route and/or the information about the weather and/or selection of a playlist of songs from a music system and/or selection of a radio station and/or setting and selection of the audio volume and/or setting and selection of the air conditioning system. The main display panel 19 can be supported by a main display frame 20 to be attached to the front side 17 of the main display unit 16. The rear side 18 includes a main dent region 35.

The main display unit 16 can be integrated in the base dent region 21. The main display unit 16 can be attached to at least one point 22 on an edge 23, as shown in FIG. 2. The main display unit 16 can be attached to the at least one point 22 on the edge 23, so that the main display unit 16 can be rotated about a base axis 25, as shown by a dashed line in FIG. 4, parallel to the edge 23 of the base dent region 21. A double directional arrow 24 denotes the directions of rotation of the main display unit 16 about the base axis 25.

Figure 4:
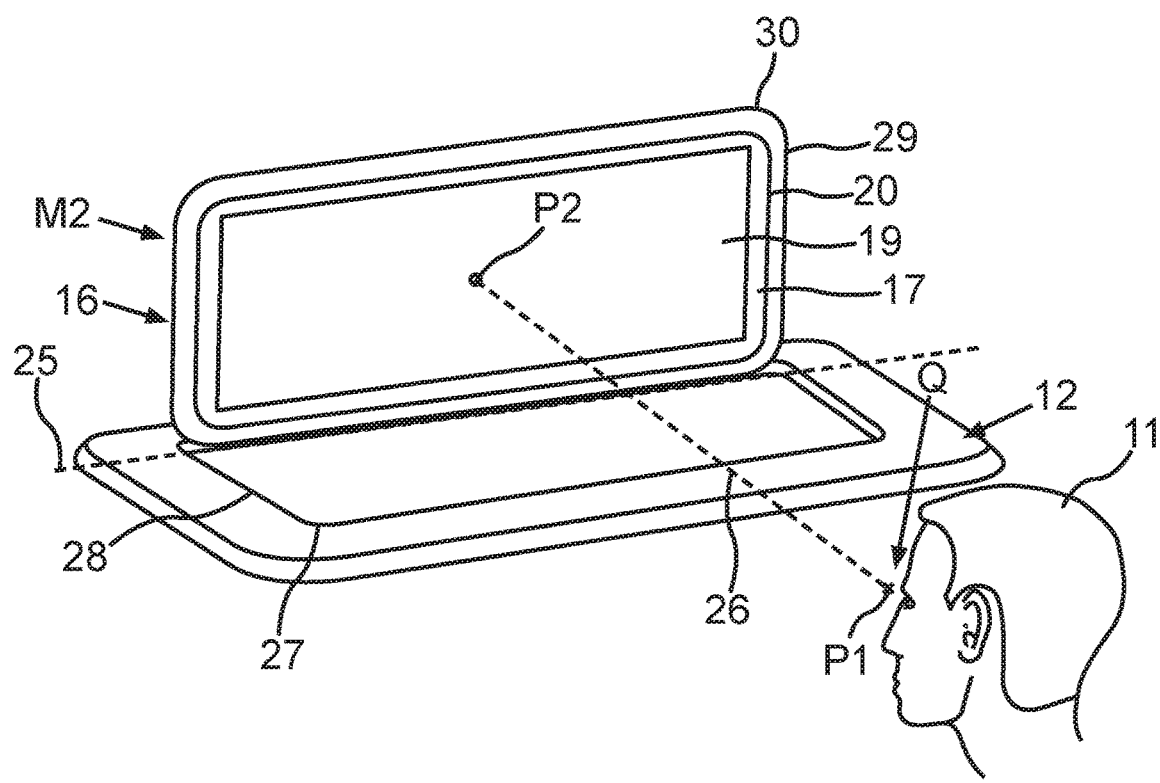
FIG. 4 is a schematic perspective view of an embodiment of the display device.

The main display unit 16 can be rotated about the base axis 25 between a main loaded position M1, as shown in FIG. 2 and FIG. 3, where the main display panel 19 is completely loaded in the base dent region 21, and a main viewing position M2, as shown in FIG. 1 and FIG. 4, where information on the main display panel 19 can be visually accessible to the user 11 from a predefined position Q. The predefined head position Q is shown by a point P1, where the eyes of the user 11 are directed towards a point P2 on the main display panel 19. A resulting line of view from the predefined head position Q is depicted by a dashed line 26 joining the point P1 and the point P2 on the main display panel 19. The predefined head position Q may correspond to an eye position of the user 11 when the user 11 rests his/her head against a head rest of a driver seat. Furthermore, the main display unit 16 can be designed to be adjusted by rotating the main display unit between an angle B1 of 45 degrees and 200 degrees about the base axis 25. This enables the user 11 to adjust the main display unit 16, in such a manner, so that the user 11 can have good view of the information on the main display panel 19.

For example to change at a particular point of time, then the user 11 can send an input signal (not shown in the figure) to the electronic control unit by an input device (not shown in the figure). The input signal can be realized by pressing a button on the input device or by a gesture of the user or by an haptic signal. After receiving the input signal by the electronic control unit, the main display unit 16 can be rotated by the electronic control unit about the base axis 25 from the main loaded position M1 to the main viewing position M2.

Furthermore, a contour 27 and an inner perimeter 28 of the base dent region 21 can correspond to a contour 29 and an outer parameter 30 of the main display unit 16. Hence, in the main loaded position M1, it can be ensured that the main display unit 16 occupies the base dent region 21 effectively and the main display panel 19 can be completely loaded in the base dent region 21.

Furthermore, the display device 10 can have an auxiliary display unit 31. The auxiliary display unit 31 can have a smaller size, particularly in a display height as compared to the main display unit 16. The auxiliary display unit 31 can have a front side 32 and a rear side 33. The front side 32 of the auxiliary display unit 31 includes an auxiliary display panel 34. The auxiliary display panel 34 can be a liquid crystal display panel. The auxiliary display panel 34 can display selected set of information from that of the information displayed on the main display panel 19. The selected set of information can include information such as the navigation route.

The auxiliary display unit 31 can be integrated in the main dent region 35. The auxiliary display unit 31 can be attached to at least one point 36 on an edge 37 of the main dent region 35.

The auxiliary display unit 31 can be rotated about the main axis 38 parallel to the edge 37. A double directional arrow 40 denotes the directions of rotation of the auxiliary display unit 31 about the main axis 38. The auxiliary display unit 31 can be rotated about a main axis 38 between an auxiliary loaded position A1, as shown in FIG. 2, where the auxiliary display panel 34 is completely loaded in the main dent region 35, and an auxiliary viewing position A2, as shown in FIG. 1 and FIG. 3, where information on the auxiliary display panel 34 can be visually accessible to the user 11 from the predefined position Q. The predefined head position Q is shown by the point P1, where the eyes of the user 11 are directed towards a point P3 on the auxiliary display panel 34. A resulting line of view from the predefined head position Q is depicted by a dashed line 39 joining the point P1 and the point P3 on the auxiliary display panel 34. Furthermore, the auxiliary display unit 31 can be designed to be adjusted by rotating the auxiliary display unit 31 between an angle B2 of 45 degrees and 200 degrees about the main axis 38. This enables the user 11 to adjust the auxiliary display unit 31 by sending an input signal to the electronic control unit by the input device in such a manner, so that the user 11 can have good view of the information on the auxiliary display panel 34.

Furthermore, a contour 41 and an inner perimeter 42 of the main dent region 35 can correspond to a contour 43 and an outer parameter 44 of the auxiliary display unit 31. Hence, in the auxiliary loaded position A1, it is ensured that the auxiliary display unit 31 occupies the main dent region 35 effectively and the auxiliary display panel 34 can be completely loaded in the main dent region 35.

FIG. 1 shows that the main display unit 16 is in the main viewing position M2, whereas the auxiliary display unit 31 is in the auxiliary viewing position A2. In this case, the user 11 can view the information on the main display panel 19 from the predefined head position Q. However, if the user 11 chooses to change a display panel by sending the input signal to the electronic control unit by the input device, in order to view the information on the auxiliary display panel 34 instead of the main display panel 16. The main display unit 16 can rotated about the base axis 25 from the main viewing position M2 to the main loading position M1, whereas then the auxiliary display panel 34 can be visually accessible to the user 11 from the predefined head position Q.

In FIG. 2, the main display unit 16 is in the main loading position M1 and the auxiliary display unit 31 is in the auxiliary loading position A1. This can be useful in a case, when the user 11 does not require the display device 10 to view information on the display panel, that is the main display panel 19 or the auxiliary display panel 34 of the display device 10.

However, as shown in FIG. 3, the user 11 can choose the auxiliary display unit 31 to view the information on the auxiliary display panel 34 by sending the input signal to the electronic control unit by the input device. In this case, the user 11 can rotate the auxiliary display unit 31 from the auxiliary loaded position A1, as shown in FIG. 2, to the auxiliary viewing position A2. This user 11 can adjust the auxiliary viewing position A2 by sending the input signal to the electronic control unit by the input device. The electronic control unit can then rotate the auxiliary display unit 31 about the main axis 38 to an angle B2, for example 75 degrees, so that the user 11 can have an optimal view from the predefined head position Q. Furthermore, the main display unit 16 remains in the main loading position M1, as shown in FIG. 2 and FIG. 3.

FIG. 4 shows an illustration of the display device 10, where the user 11 can choose the main display unit 16 by sending the input signal to the electronic control unit by the input device, in order to view the information on the main display panel 19, for example during autonomous driving. In this case, the user 11 can send the input signal to the electronic control unit by the input device rotate the main display unit 16 from the main loaded position M1, as shown in FIG. 2 and FIG. 3, to the main viewing position M2. This user 11 can adjust the main viewing position M2 by sending an input signal to the electronic control unit by the input device. The electronic control device can rotate the main display unit 16 about the base axis 25 to an angle B1, for example 80 degrees, so that the user 11 can have an optimal view from the predefined head position Q.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A display device, comprising:
a base unit with a front side and a rear side, the rear side having a base dent region;
a main display unit with a display side and a dent side with a main dent region, the display side of the main display unit having a main display panel, the main display unit fitting in the base dent region, attached to at least one point on a base edge of the base dent region and configured to rotate about a base axis parallel to the base edge of the base dent region between a main loaded position where the main display panel is completely disposed in the base dent region, and a main viewing position where information on the main display panel is visually accessible to a user from a predefined head position; and
an auxiliary display unit having a first side and a second side, the first side of the auxiliary display unit having an auxiliary display panel, the auxiliary display unit fitting in the main dent region and configured to be visually accessible to the user from the predefined head position by rotating the main display unit about the base axis.

2. A display device according to claim 1, wherein the auxiliary display unit is attached to at least one point on a main dent edge of the main dent region and is configured to rotate about a main axis parallel to the edge of the main dent region between an auxiliary loaded position where the auxiliary display panel is completely loaded in the main dent region, and an auxiliary viewing position where information on the auxiliary display panel is visually accessible to the user from the predefined head position when the main display unit is in the main loaded position.

3. A display device according to claim 2, further comprising an electronic control unit configured to keep at least one of the main display unit in the main loaded position and the auxiliary display unit in the auxiliary loaded position.

4. A display device according to claim 3, wherein a base dent contour and a base inner perimeter of the base dent region correspond to a main display contour and a main outer perimeter of the main display unit and a main dent contour and a main inner perimeter of the main dent region correspond to an auxiliary display contour and an auxiliary outer perimeter of the auxiliary display unit.

5. A display device according to claim 4, wherein the auxiliary display unit has a smaller size than the main display unit.

6. A display device according to claim 5, wherein the main viewing position is adjustable by rotating the main display unit between an angle of 45 degrees and 200 degrees about the base axis.

7. A display device according to claim 6, wherein the auxiliary viewing position is adjustable by rotating the auxiliary display unit between an angle of 45 degrees and 200 degrees about the main axis.

8. A display device according to claim 7, wherein the front side of the base unit is attached to a surface.

9. A display device according to claim 1, wherein a base dent contour and an inner perimeter of the base dent region correspond to a main display contour and an outer perimeter of the main display unit.

10. A display device according to claim 1, wherein a main dent contour and an inner perimeter of the main dent region correspond to an auxiliary display contour and an outer perimeter of the auxiliary display unit.

11. A motor vehicle, comprising:
a chassis; and
a display device including
- a base unit with a front side and a rear side, the rear side having a base dent region,
- a main display unit with a display side and a dent side with a main dent region, the display side of the main display unit having a main display panel, the main display unit fitting in the base dent region, attached to at least one point on a base edge of the base dent region and configured to rotate about a base axis parallel to the base edge of the base dent region between a main loaded position where the main display panel is completely disposed in the base dent region, and a main viewing position where information on the main display panel is visually accessible to a user from a predefined head position, and
- an auxiliary display unit having a first side and a second side, the first side of the auxiliary display unit having an auxiliary display panel, the auxiliary display unit fitting in the main dent region and configured to be visually accessible to the user from the predefined head position by rotating the main display unit about the base axis.

12. A motor vehicle according to claim 11, further comprising an electronic control unit configured to keep the main display unit in the main viewing position during autonomous driving of the motor vehicle, and the auxiliary display unit in the auxiliary viewing position during manual driving of the motor vehicle.

13. A motor vehicle according to claim 11, wherein the auxiliary display unit is attached to at least one point on a main dent edge of the main dent region and is configured to rotate about a main axis parallel to the edge of the main dent region between an auxiliary loaded position where the auxiliary display panel is completely loaded in the main dent region, and an auxiliary viewing position where information on the auxiliary display panel is visually accessible to the user from the predefined head position when the main display unit is in the main loaded position.

14. A motor vehicle according to claim 13, wherein a base dent contour and a base inner perimeter of the base dent region correspond to a main display contour and a main outer perimeter of the main display unit and a main dent contour and a main inner perimeter of the main dent region correspond to an auxiliary display contour and an auxiliary outer perimeter of the auxiliary display unit.

15. A motor vehicle according to claim 14, wherein the auxiliary display unit has a smaller size than the main display unit.

16. A motor vehicle according to claim 15, wherein the main viewing position is adjustable by rotating the main display unit between an angle of 45 degrees and 200 degrees about the base axis.

17. A motor vehicle according to claim 16, wherein the auxiliary viewing position is adjustable by rotating the auxiliary display unit between an angle of 45 degrees and 200 degrees about the main axis.

18. A motor vehicle according to claim 17, wherein the front side of the base unit is attached to a surface.

19. A motor vehicle according to claim 11, wherein a base dent contour and an inner perimeter of the base dent region correspond to a main display contour and an outer perimeter of the main display unit.

20. A motor vehicle according to claim 11, wherein a main dent contour and an inner perimeter of the main dent region correspond to an auxiliary display contour and an outer perimeter of the auxiliary display unit.

* * * * *